United States Patent Office 3,558,440
Patented Jan. 26, 1971

3,558,440
METHOD OF SEPARATING THE RARE EARTHS BY FRACTIONAL CO-DISTILLATION OF THEIR VOLATILE CHELATE DERIVATIVES
Charles W. Harris, Dayton, Robert E. Sievers, Fairborn, and Kent J. Eisentraut, Xenia, Ohio, assignors to the United States of America as represented by the Secretary of the Air Force
No Drawing. Filed June 4, 1968, Ser. No. 734,192
Int. Cl. B01d 3/34; C01f 17/00
U.S. Cl. 203—38
5 Claims

ABSTRACT OF THE DISCLOSURE

A method of separating by fractional distillation two or more non-volatile compounds of rare earths comprising the steps of converting the compounds of the rare earths to their corresponding volatilizable chelate, distilling a mixture of the chelates and a co-distilling agent to obtain enriched fractions of said chelates in said agent, collecting said enriched fractions, acidifying each of said fractions to form (a) a water-rare earth salt phase and (b) a co-distilling agent and ligand phase, and collecting the rare earth salt by stripping the rare earth salt of water.

BACKGROUND OF THE INVENTION

(1) Field of the invention

This invention relates to a method for separating rare earth elements by first preparing heat stable-volatile chelates of the elements with β-diketone ligands, adding a co-distilling agent to the chelate mixture and fractionally distilling. This method permits the separation of large scale quantities of rare earths and provides a quite versatile and economical method of separation whether it be on a laboratory scale or for large scale plant applications.

(2) Description of the prior art

Expensive ion exchange processes are presently used for separating the rare earths and producing them in good purity. The process is long and costly and requires large capital investment. In the present invention an inexpensive and simple distillation apparatus can be used for separating the rare earths after the elements present in a crude sample of the rare earths have been converted to their chelates.

SUMMARY OF THE INVENTION

The invention relates to a process for separating the rare earth elements in the form of their chelates (metal-organic complexes). The chelates specifically involved are those prepared from the reaction of the salts of the rare earths and a ligand such as 2,2,6,6 - tetramethyl - 3,5- heptanedione H(thd). The chelates are then fractionally distilled with a co-distillant. Thereafter the rare earth salt and ligand are regenerated.

DESCRIPTION OF THE PREFERRED EMBODIMENTS

According to the present invention the various natural occurring forms of the rare earths, such as their oxides and salts, which are non-volatile, are converted to volatile chelates by reacting with a ligand such as 2,2,6,6-tetramethyl-3,5-heptanedione pursuant to the method set forth in the J. Am. Chem. Soc., 87, 5254–5256 (1965). Other ligands, including β-diketones, can be used as the organic moiety provided the rare earth chelates obtained are volatile and thermally stable at the temperature necessary for fractional distillation. The chelates used in this invention are of the general form

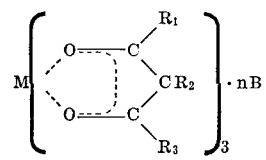

where $n$ has a value of 0 to about 10 and where $R_1$, $R_2$, $R_3$ may be —$C(CH_3)_3$, —$CH_2C(CH_3)_3$ and higher homologues plus their halogenated derivatives;

—$CF_3$, —$CF_2CF_3$, —$CF_2CF_2CF_3$ and higher homologues; —H, —$C(CH_2)_xH$, where $x$ is an integer, or branched chained analogues or halogenated derivatives of —$C(CH_2)_xH$. The preferred halogen is fluorine. B represents other donor groups such as water and selected nucleophilic moieties such as the organic bases and ketones plus their halogenated derivatives. M is the rare earth and may be one of the following: scandium, yttrium, cerium, lanthanum, praseodymium, neodymium, promethium, samarium, europium, gadolinium, terbium, dysprosium, holmium, erbium, thulium, ytterbium and lutetium. Other metals can be separated by the methods described in this invention provided their complexes are thermally stable and volatile and the complexes have different enough volatilities to make them amenable to separation by this process.

As illustrative of the invention the following examples are given:

EXAMPLE I

A mixture of two complexes, 0.5 g. each of Er(thd)₃ and Nd(thd)₃ in 50 ml. of mineral oil (B.P. 300–450° C.) was placed in a 100 ml. round bottom flask fitted with a heating mantle and the mixture was fractionally distilled through a 18″ x 1″ Vigreaux column wrapped with heating tape. A take-off head was attached to the column and to this a receiver containing the required number of flasks for taking fractions (cuts) at various temperatures. At a nearly constant reduced pressure five fractions were collected as distillates. A residue (6th) was allowed to remain in the distillation flask. The following separation of fractions (cuts) was obtained:

TABLE I

| Fractions | B.P. | Pressure, mm. Hg | Moles collected Er(thd)₃ | Nd(thd)₃ |
|---|---|---|---|---|
| I | 105–109 | 0.02 | 6.48×10⁻⁴ | 0 |
| II | 135–157 | 0.2 | 1.69×10⁻³ | 1.38×10⁻⁴ |
| III | 157–170 | 0.2–0.5 | 2.53×10⁻³ | 2.76×10⁻⁴ |
| IV | 170–174 | 0.35–0.45 | 3.58×10⁻³ | 6.21×10⁻⁴ |
| V | 182–194 | 1.25 | 4.69×10⁻³ | 1.78×10⁻³ |
| VI | Residue | | 8.33×10⁻⁴ | 4.42×10⁻³ |

From these figures and the molecular weight, the percent distilled in each fraction can be calculated.

TABLE II

| Fraction | Percent of total sample Er(thd)₃ | Nd(thd)₃ |
|---|---|---|
| I | 2.32 | 0 |
| II | 6.07 | .48 |
| III | 9.05 | .97 |
| IV | 12.80 | 2.18 |
| V | 16.78 | 6.25 |
| VI (residue) | 2.98 | 40.11 |

Using these figures, one can calculate the

TABLE III

Percent of Er(thd)$_3$ and Nd(thd)$_3$ in Each Fraction

| Fraction | Er(thd)$_3$ | Nd(thd)$_3$ |
|---|---|---|
| I | 100 | |
| II | 92.7 | 7.3 |
| III | 90.4 | 9.6 |
| IV | 85.6 | 14.4 |
| V | 73.1 | 26.9 |
| VI (residue) | 16.2 | 83.8 |

In this distillation using a column with an efficiency of five plates or less, there was obtained 35% of distillate with a purity of over 90%.

EXAMPLE II

The procedure of Example I was repeated except the rare earth chelates or complexes were Er(thd)$_3$ and Ho(thd)$_3$ and a mineral oil having a B.P. range of 300–450° C. at atmospheric conditions were used. The following separation of fractions was obtained:

TABLE IV

| Fraction | B.P. | Pressure, mm. Hg | Moles collected | |
|---|---|---|---|---|
| | | | Er(thd)$_3$ | Er(thd)$_3$ |
| I | 136–138 | 0.1 | 1.544×10$^{-5}$ | 7.318×10$^{-5}$ |
| II | 138–141 | 0.1 | 3.936×10$^{-5}$ | 2.038×10$^{-6}$ |
| III | 141 | 0.1 | 1.047×10$^{-4}$ | 6.429×10$^{-5}$ |
| IV | 142–148 | 0.1 | 2.207×10$^{-4}$ | 9.826×10$^{-5}$ |
| V | 152–154 | 0.1 | 5.171×10$^{-5}$ | 1.254×10$^{-4}$ |
| VI | 154–180 | 0.1 | 1.081×10$^{-5}$ | 5.018×10$^{-5}$ |
| VII | 180– | 0.1 | 1.54×10$^{-7}$ | 4.181×10$^{-6}$ |

TABLE V

Percent of Total Chelate Initially Taken in Each Sample

| Fraction | Er(thd)$_3$ | Ho(thd)$_3$ |
|---|---|---|
| I | 2.23 | 1.02 |
| II | 5.71 | 2.83 |
| III | 15.19 | 8.93 |
| IV | 32.01 | 13.66 |
| V | 7.50 | 17.42 |
| VI | 1.57 | 6.97 |
| VII | 0.03 | 0.58 |

TABLE VI

Percent of Each Chelate in Distilled Fraction

| Fraction | Er(thd)$_3$ | Ho(thd)$_3$ |
|---|---|---|
| I | 68.62 | 31.38 |
| II | 66.86 | 33.14 |
| III | 62.98 | 37.02 |
| IV | 70.09 | 29.91 |
| V | 30.10 | 69.90 |
| VI | 18.38 | 81.62 |
| VII | 4.92 | 95.08 |

EXAMPLE III

The procedure of Example I was repeated except the rare earth chelates were Ho(thd)$_3$ and Nd(thd)$_3$, the fractionating column was of the platinum spinning band column, and co-distilling agents of di-n-butylphthalate and di-n-octylphthalate were used. The following separation of fractions was obtained:

| Fraction | B.P., °C. | Pressure, mm. Hg | Moles collected | | Percent of total chelate in each fraction | |
|---|---|---|---|---|---|---|
| | | | Ho(thd)$_3$ | Nd(thd)$_3$ | Ho(thd)$_3$ | Nd(thd)$_3$ |
| I | 96.5–106 | 0.1 | 1.129×10$^{-3}$ | None | 71.88 | |
| II | 179.0–186.0 | 0.1 | None | 4.211×10$^{-3}$ | | 25.54 |

The above data indicates that one can distill nearly three-fourths of the chelate of a rare earth without distilling the chelate of another rare earth. As measured, the percent of Ho(thd)$_3$ and Nd(thd)$_3$ in each fraction was 100%.

In carrying out the present invention the following considerations should be borne in mind. The chelates are fractionally distilled with a co-distilling agent having the following characteristics:

(a) thermally stable at the distilling temperatures and not chemically decomposed by the chelate;

(b) a solvent for the chelates from room temperature to the distillation temperature; and (c) having a vapor pressure in the same range as the chelates being separated.

It should be apparent that a mixture of co-distilling agents which satisfy the above criteria can be used in place of a single co-distilling agent.

Where a mineral or hydrocarbon oil is the co-distilling agent, the particular rare earth chelates involved will determine the mineral oil to be used. Thus hydrocarbons in the $C_{20}$–$C_{25}$ would have suitable vapor pressures for effecting the separation of Er(thd)$_3$ and Ho(thd)$_3$ whereas a $C_{34}$ hydrocarbon is needed when a separation involving Nd(thd)$_3$ is carried out. A hydrocarbon to chelate ratio of 50 to 1 has proven very satisfactory. Other co-distilling agents may be used, for example, the organic esters as illustrated by the glycol and phthalate esters, such as the di-alkyl phthalates having 4 to 10 carbon atoms, which have boiling ranges of 300–450° C.

The chelating agent (or ligand) and rare earth salt can be regenerated as follows: To the solution (chelate in codistilling agent) of Example II was added an excess of 10% hydrochloric acid solution. The two phase system was vigorously agitated for several minutes. The two phases, water-rare earth salt and phthalate- (or co-distilling agent) ligand, were then separated. The water phase was stripped of water to give the rare earth salt while the phthalate layer containing the ligand can be used in step one of process to give the chelate of a rare earth. The ligand can also be distilled off for future use if desired.

Although 10% hydrochloric acid is preferred other mineral acids, such as nitric and sulfuric, and certain organic acids, such as oxalic and citric, can be used.

Various modifications will be apparent to those familiar with the art. For example, other fractionating apparatus may be used to allow more efficient separations such as a distilling column of the bubble cap design or the spinning band type. These columns will be found desirable for the more difficult to separate sets of chelates, such as Dy(thd)$_3$ and Er(thd)$_3$, whose vapor pressures are close together as shown by the following table.

TABLE I

Calculated Vapor Pressures, P. (mm.), of Various Rare Earth Complexes, M(thd)$_3$, at 200° C. (473.15° K.)

| M(thd)$_3$ | P. (mm.) | Remarks |
|---|---|---|
| La | 0.192 | Solid at 200° C. |
| Pr | 0.601 | Do. |
| Nd | 0.982 | Do. |
| Sm | 2.761 | Liquid at 200° C. |
| Eu | 3.041 | Do. |
| Gd | 3.126 | Do. |
| Tb | 3.467 | Do. |
| Dy | 3.524 | Do. |
| Ho | 3.758 | Do. |
| Er | 3.990 | Do. |
| Tm | 4.285 | Do. |
| Yb | 4.732 | Do. |
| Lu | 4.592 | Do. |

A bubble cap design which has proven particularly satisfactory is described in Ind. & Eng. Chem. Anal. Ed., 8, 224 (1936). Typical of the spinning band type are the Teflon spinning band column and the platinum spinning band column. The present invention is also applicable to the closely related elements with atomic numbers 90–102 inclusive.

It is to be understood that the forms of the invention herein shown and described are to be taken as preferred examples of the same and that further modifications may be made without departing from the spirit of the invention or the scope of the following claims.

What is claimed is:

1. A method of separating by fractional distillation at least two and up to seventeen volatile compounds obtained from non-volatile compounds of the rare earths selected from the group consisting of Sc, Y, La, Ce, Pr, Nd, Pm, Sm, Eu, Gd, Tb, Dy, Ho, Er, Tm, Yb, and Lu comprising the steps of reacting the non-volatile compounds of the rare earths with a β-diketone ligand to form the corresponding chelates which are characterized by being volatile and thermally stable during a subsequent fractional distillation, fractionally distilling a mixture of the chelates and a co-distilling agent, which is a solvent for said chelates, is thermally stable at the distilling temperature, will not chemically decompose the chelates, and has a boiling range and vapor pressure substantially the same as the chelates, to obtain purified fractions of said chelates in said agent, collecting said purified fractions, acidifying each of said fractions to form (a) a water-rare earth salt phase, and
(b) a co-distilling agent and ligand phase, and collecting the rare earth salt by stripping the rare earth salt of water.

2. The method of claim 1 in which the rare earths being separated are Er and Nd.

3. The method of claim 1 in which the rare earths being separated are Ho and Nd.

4. The method of claim 1 in which the rare earths being separated are Er and Ho.

5. The method of claim 1 including the further step of recovering the ligand by distilling the co-distilling agent and ligand phase.

References Cited

UNITED STATES PATENTS

| | | | |
|---|---|---|---|
| 2,944,878 | 7/1960 | Jacque et al. | 23—17X |
| 3,429,904 | 2/1969 | Eisentraut et al. | 23—17X |

OTHER REFERENCES

Eisentraut et al.: "Journal of the American Chemical Society," vol. 87, November 1965, pp. 5254–5256.

Eisentraut et al.: "Journal of Inorganic and Nuclear Chemistry," vol. 29, 1967, pp. 1931–1936.

Chemical & Engineering News, Nov. 22, 1965, pp. 39–40.

HERBERT T. CARTER, Primary Examiner

U.S. Cl. X.R.

23—17, 22, 23; 260—429.2; 203—62, 52, 60, 68